United States Patent [19]

Minns

[11] 4,426,505
[45] Jan. 17, 1984

[54] POLYMERS CONTAINING DECAHALOPENTACYCLODECYL GROUPS

[75] Inventor: Richard A. Minns, Arlington, Mass.

[73] Assignee: Polaroid Corporation, Cambridge, Mass.

[21] Appl. No.: 352,085

[22] Filed: Feb. 25, 1982

[51] Int. Cl.³ .................... C08F 20/24; C08F 20/58
[52] U.S. Cl. .................... 526/283; 264/1.1; 264/1.3; 526/282; 560/220; 564/204; 568/665; 568/817
[58] Field of Search ............................ 526/282, 283

[56] References Cited

U.S. PATENT DOCUMENTS 2,516,404  7/1950  McBee et al. .................... 260/1
3,738,970  6/1973  Cimino et al. .................... 260/78.4 D
3,816,543  6/1974  Creighton .......................... 526/282

OTHER PUBLICATIONS

Y. Okaya et al., Acta Crystallog. 22(1), 111–119, (1967).
R. G. Pews, Canadian J. of Chem., vol. 47, 1260–1262, (1969).
R. G. Pews et al., J. Org. Chem. 34(6), 2029–2030, (1969).
R. G. West et al., J.A.C.S., 90 (17), 4697–4701, (1968).

Primary Examiner—Stanford M. Levin
Attorney, Agent, or Firm—Louis G. Xiarhos

[57] ABSTRACT

New polymers are disclosed comprising recurring units of the formula

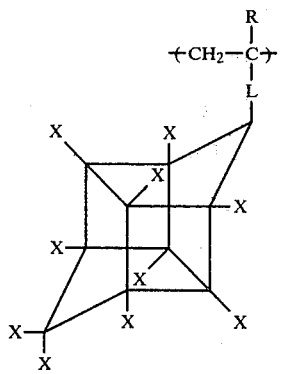

wherein R is hydrogen or lower alkyl containing from 1 to 5 carbon atoms, L is a divalent linking group, and each X is independently chloro or bromo. The polymers are capable of providing a relatively high index of refraction in combination with a relatively high Abbe number and can be utilized as raw materials in the manufacture of plastic optical articles or elements such as lenses or prisms and in the manufacture of optical films and coatings.

14 Claims, No Drawings

POLYMERS CONTAINING DECAHALOPENTACYCLODECYL GROUPS

BACKGROUND OF THE INVENTION

The present invention relates to novel compositions and in particular to novel polymers having a high index of refraction and low dispersive power.

In the design and manufacture of lenses and lens systems, it is often desired to use materials for lens fabrication which combine a high index of refraction, $n_D$, with low dispersive power or high Abbe number $v$ ($v$ equals the reciprocal of the dispersive power). Materials displaying this combination of optical properties can be used to prepare lenses characterized by very low astigmatism and very low chromatic aberration. The barium and lanthanum crown glasses are especially useful in this regard. Certain dense barium crown glasses, for example, combine a relatively high index of refraction of about 1.57 to 1.62 with a relatively high Abbe number of about 58 to 61. Certain lanthanum crown glasses combine an index of refraction of about 1.65 to 1.70 with an Abbe number of about 55 to 59. Thus, these glasses can be used to fabricate lenses of superior optical performance and provide the lens designer with considerable latitude in the design of precision lenses and optical systems.

It is often preferred to use plastic or, more precisely, polymeric materials, rather than glass, as raw materials for lens manufacture. In general, the polymeric materials which are used can be more easily fabricated into lenses, usually by molding techniques, and provide lenses which are lighter and less expensive than similar glass lenses. The conventional polymers used for plastic lens manufacture do not, however, provide combinations of index of refraction and Abbe number values which can be said to compare favorably with the combinations provided by optical glasses, such as the aforementioned barium and lanthanum crown glasses. Polystyrene, for example, which is a commonly used polymer for plastic lens manufacture, combines a relatively high index of refraction of about 1.59 at 20° C. with a relatively low Abbe number of about 31. Polymethylmethacrylate, another commonly used raw material for plastic lens manufacture, combines a relatively high Abbe number of about 57 with a relatively low index of refraction of about 1.49 at 20° C. Other conventional polymers which are used or are candidates for use as raw materials in plastic lens manufacture also do not provide index of refraction and Abbe number combinations which compare favorably with those provided by optical glasses. As a result, plastic lenses fabricated from the conventional polymers are not capable of providing the optical performance provided by lenses fabricated from optical glasses and, accordingly, are subject to design and use limitations.

Thus, there is a continuing need for new polymers which can be used as raw materials in plastic lens manufacture and which provide index of refraction and Abbe number combinations which exceed combinations provided by the conventional polymers.

SUMMARY OF THE PRESENT INVENTION

According to the present invention, novel polymers having favorable optical properties are provided. In particular, certain polyvinyl polymers are provided which combine a relatively high index of refraction with a relatively high Abbe number so as to provide optical properties which exceed those of the conventional polymers used in plastic lens manufacture. The polymers of this invention comprise recurring units of the formula

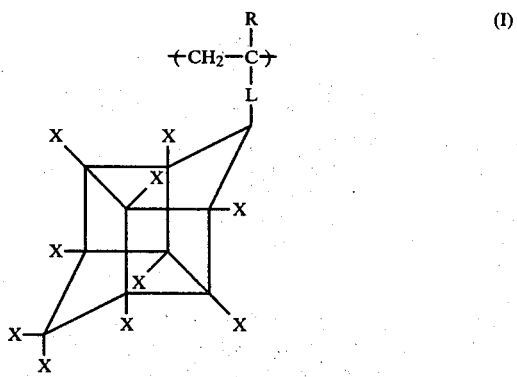

wherein R is hydrogen or lower alkyl of 1 to 5 carbon atoms, L is a divalent linking group, and each X is independently chloro or bromo. Both homopolymers and copolymers are provided.

The halogenated cyclic pendant group shown in the recurring unit of formula I is a decahalopentacyclo[$5.3.0.0^{2,6}.0^{3,9}.0^{4,8}$]decyl group. Alternatively, this group can be termed a decahalooctahydro-1,3,4-metheno-1H-cyclobuta[cd]pentalenyl group. The halogenated cyclic pendant group shown in the recurring unit of formula I is hereinafter referred to, in the interests of brevity and convenience, as a decahalopentacyclodecyl group.

Although the polymers of this invention can be used for preparing films and protective coatings, the combination of a high index of refraction and high Abbe number makes them of especial interest for the fabrication of lenses displaying desirable optical performance characteristics.

Preferred polymers are those comprising a flexible divalent linking group L which spaces the halogenated pentacyclodecyl pendant group away from the polymer backbone. In general, the resultant polymers have enhanced moldability and, thus, are preferred among the polymers of this invention for the manufacture of optical lenses by molding techniques.

The present invention is also directed to the novel monomers used in preparation of the polymers conforming to formula (I).

For a fuller understanding of the present invention, reference should be had to the following detailed description.

DETAILED DESCRIPTION OF THE INVENTION

According to the present invention, a combination of a relatively high index of refraction and a relatively high Abbe number can be provided in a polyvinyl polymer containing, as groups pendant to the polyvinyl backbone, decahalopentacyclodecyl groups wherein the halo substituents are chloro or bromo and the substitution pattern thereof is such that only one of the saturated carbon atoms of the pentacyclodecyl group is substituted with more than one chloro or bromo substituent. Accordingly, the present invention relates to polymers comprising recurring units of the formula (I)

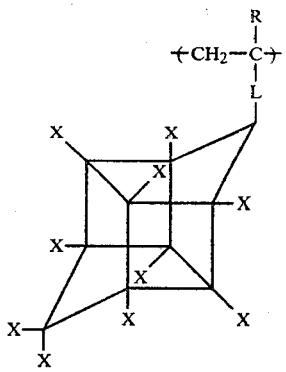
(I)

wherein R is hydrogen or lower alkyl containing from 1 to 5 carbon atoms, L is a divalent linking group, and each X is independently chloro or bromo. Polymers comprising recurring units of formula (I), and particularly those wherein each X is chloro, have been found to be capable of providing a relatively high index of refraction, $n_D$, in the range of about 1.545 to about 1.575 in combination with a relatively high Abbe number in the range of about 54 to about 57. These combinations are comparable to those provided by certain barium crown glasses and provide a level of optical performance which exceeds that provided by the conventional polymers used in plastic lens manufacture.

The polymers of this invention can contain as the linking group L any divalent group or moiety which provides a stable linkage between the polymer backbone and the decahalopentacyclodecyl group. The linking group, per se, is generally not critical to the index of refraction and Abbe number values found in the present polymers, such properties being attributable to the decahalo pentacyclodecyl group. However, a system of conjugated double bonds in the linking group, e.g., as in a phenylene group, tends to decrease the Abbe number, such that linking groups without such conjugated systems are preferred.

The linking group can be a

group such that the polymer is a polyacrylate comprising recurring units of the formula

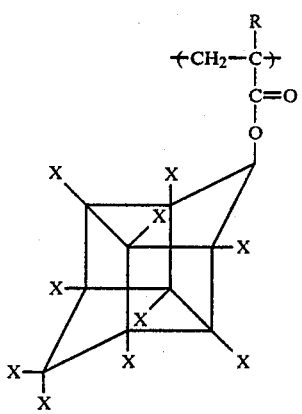

Both homopolymers and copolymers containing these recurring units can be prepared with facility and provide the favorable optical properties referred to above.

Preferred linking groups are flexible groups which space the decahalopentacyclodecyl group away from the polymer backbone, i.e., spatially remove that group from the immediate vicinity of the polymer backbone. In general, the employment of these preferred "spacer" linking groups tends to enhance the moldability of the polymer, thereby rendering it more suitable for use in the manufacture of molded articles, such as optical lenses.

Preferred flexible linking groups are those conforming to the formula

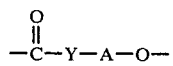

wherein A is an alkylene group containing from 1 to about 12 carbon atoms, e.g., methylene, ethylene, chlorobutylene, propylene, butylene, pentylene, isobutylene, or isopentylene, or wherein A is an alkylene ether or alkylene diether group of the formula

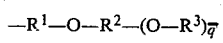

wherein $R^1$, $R^2$, and $R^3$ are the same or different alkylene groups, each containing from 1 to 6 carbon atoms, e.g., methylene, ethylene, or propylene, q is zero or 1, and —Y— is —O— or —NH—, such that polymers are provided comprising recurring units of formula (II) wherein R has the meaning aforedescribed:

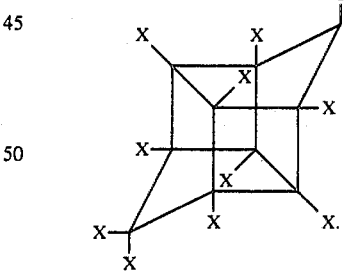
(II)

Preferably, A will be an alkylene group of from 2 to about 12 carbon atoms. Where A is an alkylene group, it can be a branched alkylene group, e.g., isobutylene or isopentylene, or a substituted alkylene group, e.g., chlorobutylene, although, from the standpoint of providing maximum flexibility in the linking group, straight chain alkylene groups, i.e., those containing only unsubstituted methylene (—CH$_2$—) groups are preferred.

Most preferably, A is a straight chain alkylene group and —Y— is —O— so as to provide acrylate polymers comprising the preferred recurring units of formula (III):

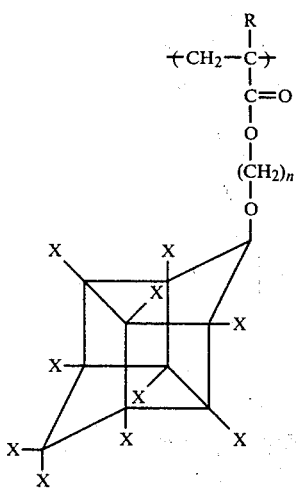

 (III)

wherein R has the meaning aforedescribed and n is 2 to 12. Polymers containing recurring units of formula (III) are generally prepared with facility, have glass transition temperatures and flow characteristics rendering them especially suited for fabrication of molded articles, and have favorable optical properties.

As stated above, the R group can be hydrogen or lower alkyl of 1 to 5 carbon atoms, e.g., methyl, ethyl, or isopropyl. In general, R will not appreciably affect the optical properties of the polymer. However, R may affect other physical properties of the polymer such as moldability and, thereby, affect utilization of the polymer in optical applications. Preferred R groups are hydrogen and methyl.

The polymers of this invention can be homopolymers or copolymers. The copolymers of this invention can contain, as recurring comonomeric units, two or more different units of formula (I), i.e., units of formula (I) differing in the nature of R, L, or X. The copolymers can also contain recurring comonomeric units other than those of formula (I), and specifically, comonomeric units derived from ethylenically unsaturated comonomers. Preferred ethylenically unsaturated comonomers are those without a system of conjugated double bonds, e.g., as in a phenylene moiety, such systems tending to decrease the Abbe number, as previously indicated. Ethylenically unsaturated comonomers which can be used in preparing the copolymers of this invention include vinyl chloride, acrylamide, N-methylacrylamide, N-ethylacrylamide, methacrylamide, N-methylmethacrylamide, N-ethylmethacrylamide, N,N-dimethylacrylamide, acrylic acid, methacrylic acid, acrylonitrile, methylacrylate, ethylacrylate, propylacrylate, butylacrylate, methylmethacrylate, ethylmethacrylate, propylmethacrylate, butylmethacrylate, 2-chloroethylacrylate, and 2-chloroethylmethacrylate.

In general, comonomeric units other than those of formula (I) are included in the polymers of this invention to provide desired physical properties such as a desired glass transition temperature or ductility. It has been found, for example, that the incorporation of various acrylate and methacrylate comonomers into polymers of this invention containing units of formula (I) wherein L is a $$-\overset{\overset{O}{\|}}{C}-O-$$

group provides copolymers having lower glass transition temperatures than those of the corresponding homopolymers, thereby providing polymers having improved moldability. Acrylate and methacrylate comonomers can also be incorporated into polymers of this invention comprising the aforementioned flexible "spacer" linking groups and may function therein to augment any improvement in moldability afforded by the flexible linking group.

With regard to the halo substituent X, the use of chloro, rather than bromo, is preferred insofar as the resultant pentacyclodecyl group is less bulky and, in general, provides more favorable molding characteristics. However, the choice of chloro or bromo can also depend on the $n_D$ and $\nu$ values which are desired. In general, a bromo substituent provides a higher refractive index and lower Abbe number than is provided by a chloro substituent. Thus, for certain optics applications, bromo substituents or a mixture of bromo and chloro substituents may be preferred.

Although the present polymers can contain pendant pentacyclodecyl groups substituted with a mixture of chloro and bromo substituents, pentacyclodecyl groups substituted only with chloro or only with bromo substituents are preferred. This preference for a decachloro- or decabromopentacyclodecyl group is based primarily on synthesis considerations. In general, the intermediates which comprise a decachloro- or decabromopentacyclodecyl group and which are used in preparing the polymers of this invention can be prepared and isolated in higher yield and purity than those intermediates having mixed substitution on the pentacyclodecyl group and, accordingly, provide preparative advantages in terms of overall yield of polymer, reproducibility, and process control.

The optical properties of the present polymers are essentially constant at room temperature and are not adversely affected by heating the polymers to temperatures moderately above their softening points for reasonable periods of time. Accordingly, the polymers of this invention can be adapted for employment in molding processes utilizing elevated temperatures and may be so employed without adverse affect on their optical properties.

Representative polymers of this invention are illustrated below. The illustrated polymers all contain either decachloropentacyclodecyl or decabromopentacyclodecyl pendant groups. For purposes of clarity and convenience, and in keeping with the practice in the art, these groups are depicted in an abbreviated form as

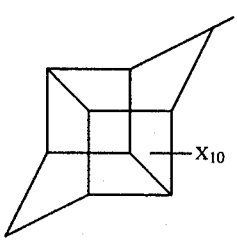

Comonomer ratios shown in the illustrated copolymers are molar ratios:
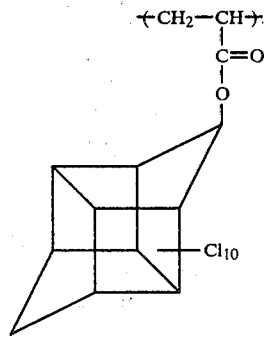 (1)
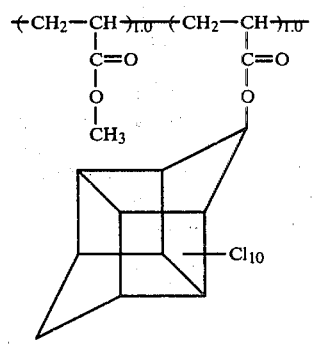 (2)
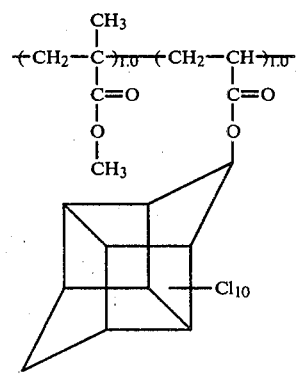 (3)
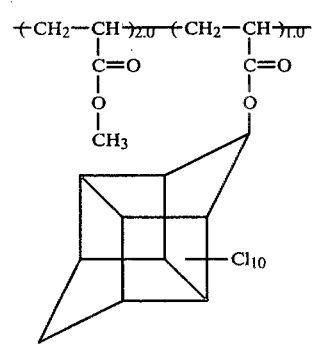 (4)
-continued
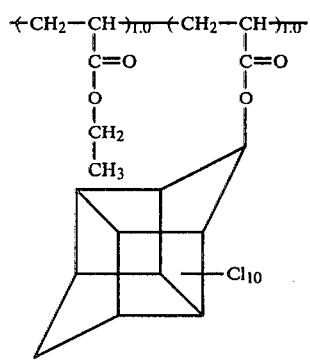 (5)
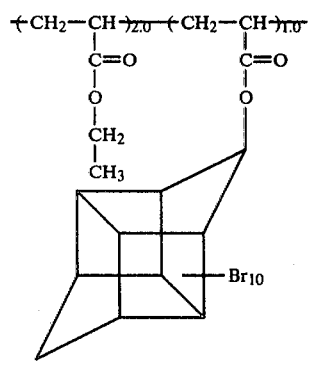 (6)
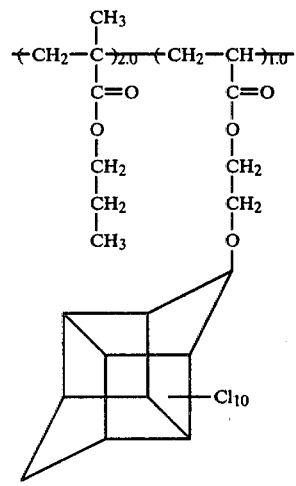 (7)
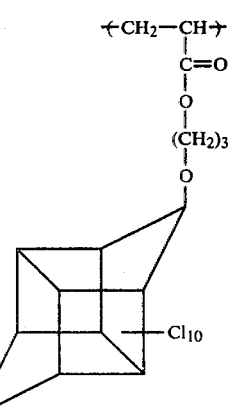 (8)

-continued
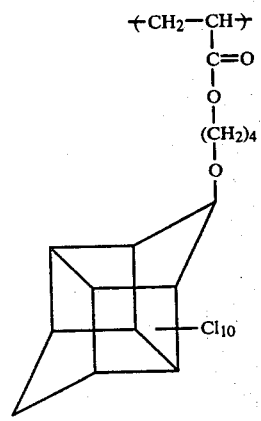 (9)
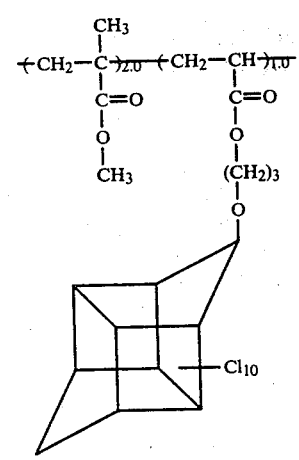 (10)
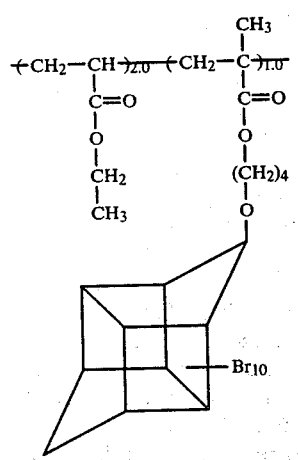 (11)
-continued
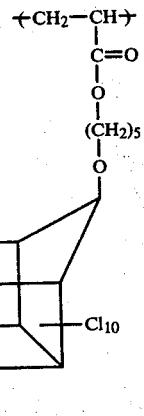 (12)
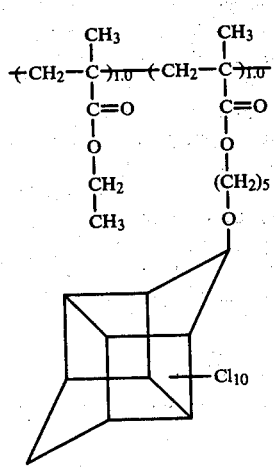 (13)
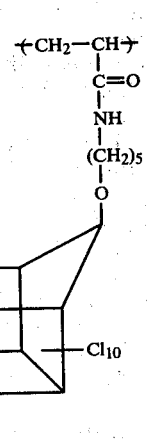 (14)

-continued $$\begin{array}{c} +CH_2-CH+ \\ | \\ C=O \\ | \\ O \\ | \\ (CH_2)_2 \\ | \\ O \\ | \\ (CH_2)_2 \\ | \\ O \end{array} \quad (15)$$

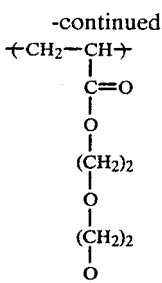

As indicated previously, the polymers of this invention combine a relatively high index of refraction with a relatively high Abbe number. While certain other synthetic polymers may be known which display a higher index of refraction or higher Abbe number than the present polymers, it is the combination of relatively high values in the present polymers which renders them of especial interest for the fabrication of optical lenses. Table I presents index of refraction ($n_D$) and Abbe number ($\nu$) values obtained at ambient temperature for films of certain representative polymers of this invention. The values presented in Table I were obtained on an Abbe refractometer by procedures described hereinafter. The symbol $n_D$ is used herein in its conventional sense and, accordingly, denotes the index of refraction obtained at the sodium "D" line of 589 nm. In Table I, the polymers are designated by previously assigned numbers:

TABLE I

| Polymer | $n_D$ | $\nu$ |
|---------|--------|-------|
| (2) | 1.5512 | 56.2 |
| (4) | 1.5445 | 56.8 |
| (5) | 1.5480 | 56.5 |
| (8) | 1.566 | 54.9 |
| (9) | 1.5678 | 54.8 |
| (12) | 1.5663 | 54.9 |

Index of refraction measurements were also conducted on homopolymer (1). The measurements were made microscopically by Becke line analysis in accordance with procedures known in the art. The method of analysis was not regarded as sufficiently accurate for measurement of the Abbe number. Employing this method of analysis, the index of refraction, $n_D$, of homopolymer (1) was determined to be 1.573.

As stated previously, the copolymers of this invention can include recurring comonomeric units other than those of formula (I). It will be appreciated that the inclusion of such comonomeric units results in a decreased weight concentration of the decahalopentacyclodecyl groups in the copolymer, as compared to the corresponding homopolymer. This decrease can result in a decreased index of refraction, as demonstrated by comparison of the index of refraction values of copolymers (2), (4), and (5) in Table I and the index of refraction of 1.573 of homopolymer (1). Thus, the recurring units of formula (I) should be provided in the copolymer in a weight concentration sufficient to permit realization of desired index of refraction values. Suitable concentrations of the formula (I) units will vary with the nature of the formula (I) units and the comonomeric units, and particularly with their relative molecular weights, and with the index of refraction values which are desired. In this regard, it should be noted that the index of refraction of copolymer (4), containing recurring units of formula (I) in a weight concentration of about 77%, compares favorably with that of homopolymer (1).

It will be appreciated that utilization of the relatively long and flexible "spacer" linking groups also decreases the weight concentration of the decahalopentacyclodecyl groups in the polymer, as compared to the use of shorter linking groups of lower molecular weight. Accordingly, a diminution in the index of refraction can also occur where such linking groups are employed. The index of refraction values of polymers (8), (9), and (12) in Table I are slightly lower than the index of refraction of homopolymer (1). However, no decrease in the index of refraction is observed in progressing from the trimethylene containing linking group of polymer (8) to the pentamethylene containing linking group of polymer (12).

The decahalopentacyclodecyl group is hereinafter depicted in the abbreviated form

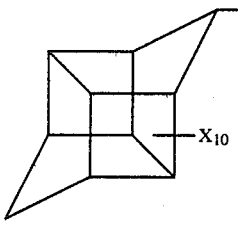

As used hereinafter, the symbol -$X_{10}$ is intended to indicate decachloro, decabromo, or mixed chloro and bromo substitution on the pentacyclodecyl group.

The polymers of this invention can be prepared utilizing, as a starting material, a compound of formula (IV)

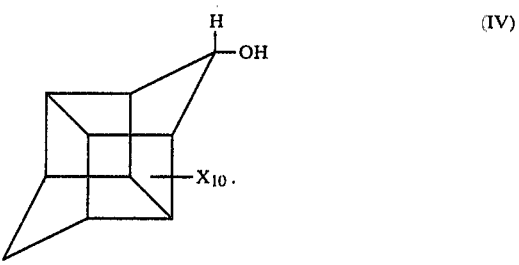

These compounds have been found to be capable of undergoing many of the reactions of secondary aliphatic alcohols in spite of the large steric requirement of the pentacyclodecyl group and to be converted into novel polymerizable monomers or into intermediates which can be further reacted to provide novel polymerizable monomers. The novel polymerizable monomers are of formula (V)

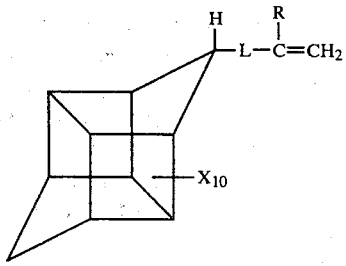

and can be homopolymerized or copolymerized to provide the present polymers.

Thus, a compound of formula (IV) can be reacted with a reagent containing a polymerizable ethylenically unsaturated group to provide a monomer of formula (V). This method of preparation is especially applicable to the preparation of acrylate monomers comprising a

group as the linking group L. Specifically, an acrylyl chloride can be reacted with a compound of formula (IV) to provide an acrylate monomer in accordance with the following reaction scheme (1):

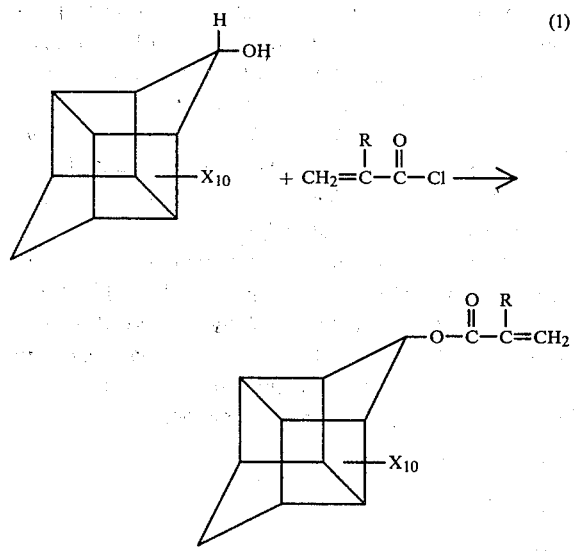

wherein X and R are as previously defined. The reaction represents a variation of the standard condensation reaction of acrylyl chlorides with secondary alcohols and, in general, can be conducted using conventional procedures. Preferably, the reaction is conducted in an organic solvent such as acetonitrile or methylene chloride using approximately equimolar amounts of compound (IV), an acrylyl chloride, and a base such as triethylamine or sodium hydride or other proton acceptors such as appropriate molecular sieves.

Monomers of formula (V) containing flexible spacer linking groups of the formula

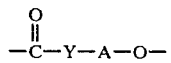

can be provided by resort to synthetic methods which may vary depending upon the particular nature of the linking group. For example, where A of the linking group is an alkylene group of from 3 to about 12 carbon atoms, or an alkylene ether or dialkylene ether as previously defined, the monomer can be provided by the following method. The compound of formula (IV) is reacted with a vinyl alkyl bromide such as 3-bromo-1-propene, 4-bromo-1-butene, 5-bromo-1-pentene, or 4-bromo-3,3-dimethyl-1-butene or a vinylalkoxyalkyl bromide such as 4-(2-bromoethoxy)-1-butene to displace the bromo moiety and provide a vinylalkyl ether or vinylalkoxyalkyl ether derivative of compound (IV). The vinyl group of the resulting derivative is then subjected to hydroboration-oxidation in accordance with known procedures to effect conversion of the vinyl group to a hydroxyethylene group and, thus, provide a compound conforming to the formula

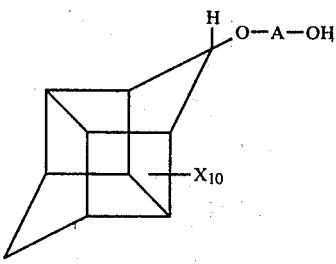

wherein X is as previously defined. The hydroxy group of this compound can be reacted with an acrylyl chloride to provide the corresponding acrylate monomer (VI):

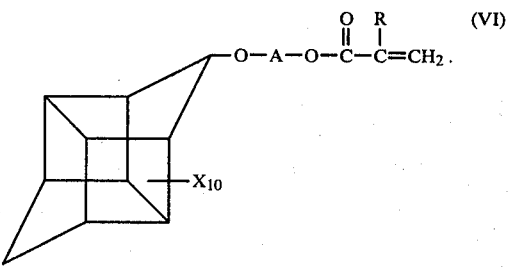

Alternatively the hydroxy group can be converted to an amine group by known preparative methods, e.g., derivatization of the hydroxy group to provide a leaving group, such as a tosylate group; reaction of the derivative with potassium azide to form the corresponding alkyl azide; and reduction of the alkyl azide to a primary amine. The primary amine can be reacted with an acrylyl chloride to prepare the corresponding acrylamide monomer (VII):

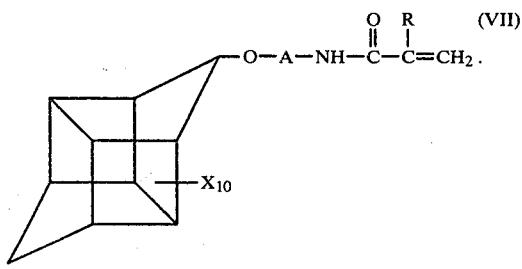

In general, conventional synthetic methods can be used in conducting the above preparative sequences.

Monomers of formula (VI) wherein A is alkylene of from 2 to about 12 carbon atoms, or an alkylene ether or diether group as previously defined, are preferably prepared by reaction of the anionic form of compound (IV) (the alkoxide form) with an alkylating agent of the formula

wherein A is as previously defined and Z and Z' are the same or different leaving groups substituted on different carbon atoms of an alkylene A group or on different alkyl radicals of an ether or diether A group, to provide an intermediate compound of formula (VIII)

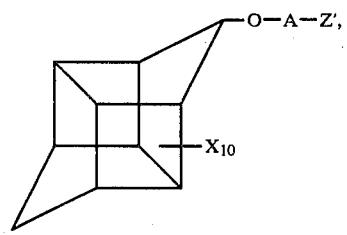

and reaction of compound (VIII) with an acrylate anion of the formula

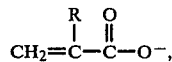

wherein R is as previously defined, to provide the desired monomer of formula (VI). This preparative method thus involves two sequential nucleophilic substitution reactions whereby the leaving groups Z and Z' are displaced by, respectively, the anion of compound (IV) and an acrylate anion. Accordingly, Z and Z' can be any group capable of being satisfactorily displaced by the appropriate anion and can be the same or different. Groups which can be used as Z and Z' include chloro, bromo, iodo, benzenesulfonyl, p-toluenesulfonyl, trifluoromethanesulfonyl, and methanesulfonyl. Preferably, both Z and Z' are bromo, such that there are provided, as preferred alkylating agents, dibromoalkanes, e.g., 1,2-dibromoethane, 1,3-dibromopropane; 1,4-dibromobutane; 1,5-dibromopentane, 1,6-dibromohexane, and 1,3-dibromobutane; bis(bromoalkyl)ethers, e.g., bis(2-bromoethyl)ether and bromomethyl-2-bromoethyl ether; and bis(bromoalkoxy)alkanes, e.g., 1,2-bis(2-bromoethoxy)ethane.

The alkylating agent is reacted with the alkoxy anion of compound (IV) in an organic solvent, e.g., acetonitrile, utilizing a base such as potassium carbonate to generate the anion. Where Z and Z' are the same or are different but have competitive reactivities, i.e., both undergo displacement by the alkoxide anion under the conditions of the reaction, it is preferred to employ a sufficient excess of the alkylating agent to minimize or prevent bis adduct formation. Compound (VIII) is preferably isolated and, if necessary, purified prior to reaction with the acrylate anion, e.g., as in Examples 11 and 12 herein.

The reaction of compound (VIII) with the acrylate anion is preferably conducted in a polar, aprotic solvent which is capable of satisfactorily dissolving both reactants. Polar, aprotic solvents which can be used include acetonitrile, propionitrile, and N,N-dimethylformamide. The acrylate anion can be provided by use of tetraalkylammonium acrylates such as tetramethylammonium acrylate, tetraethylammonium acrylate, benzyltrimethylammonium acrylate, and, preferably, tetrabutylammonium acrylate. A procedure for the preparation of tetrabutylammonium acrylate is provided in Example 11 herein. As will be apparent to those skilled in the art, the procedure can be adapted for provision of various other tetraalkylammonium acrylates.

The acrylate anion can also be provided by solubilizing an alkali metal acrylate, e.g., sodium acrylate or potassium acrylate, in the polar aprotic solvent using a well known crown ether or other macrocyclic multidentate compound as a solubilizing aid.

The copending U.S. patent application Ser. No. 352,086, of R. A. Minns and M. S. Simon, filed of even date, relates to the preparation of monomers of formula (VI) by the method described above.

Monomers of formula (VI) wherein A is a straight chain alkylene group of from two to about 12 carbon atoms are preferably prepared by the last-described method utilizing a dibromoalkane as an alkylating agent. Reaction scheme (2) illustrates the preparation of these polymers by this preferred method:

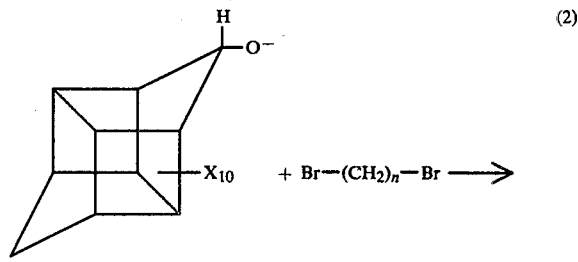

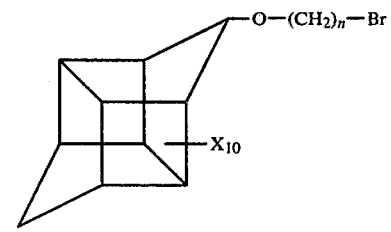

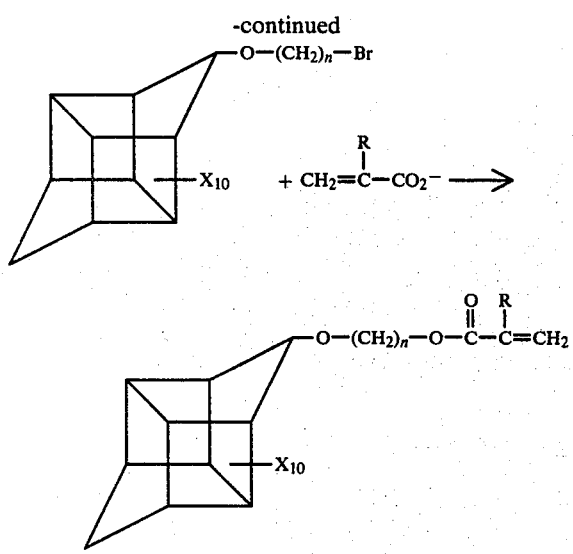

Monomers of formula (VI) wherein A is a methylene group can also be suitably prepared. Thus, a compound of formula (IV) can be chloromethylated (or bromomethylated) by reaction with formaldehyde and hydrochloric (or hydrobromic) acid to provide the halomethyl ether of compound (IV), i.e., the intermediate of formula (VIII) wherein A is methylene and the halo Z' group is chloro or bromo. The intermediate can then be reacted with an acrylate anion in accordance with the procedures described hereinbefore for production of the desired monomer.

The polymers of this invention can be prepared by polymerization of the monomers of formula (V) in an organic solvent, such as benzene or toluene, employing conventional free-radical solution polymerization methods. Free-radical initiators, such as azobisisobutyronitrile and azobis-α,γ-dimethylvaleronitrile, are used to promote the polymerization. The polymers can be isolated by evaporation of the polymerization solvent or, preferably, by precipitation into a non-solvent for the polymer, e.g., hexane.

The decachloropentacyclodecyl alcohol of formula (IV) is a known material which can be prepared by reduction of the corresponding ketone. The decabromopentacyclodecyl alcohol of formula (IV) and alcohols of formula (IV) having a mixture of chlor and bromo substituents can be similarly prepared.

Preferably, the compounds of formula (IV) are prepared by reduction of a chlorosulfate ester of formula (IX)

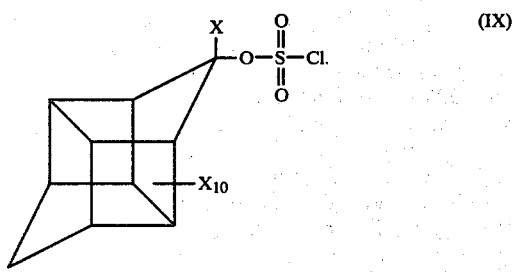

The reduction can be effected using lithium aluminum hydride or, preferably, diisobutylaluminum hydride as a reducing agent, preferably in a 5-fold or greater molar excess. The undecachloro- and undecabromo-substituted chlorosulfate esters of formula (IX) are known materials prepared by reaction of hexachlorocyclopentadiene or hexabromocyclopentadiene with chlorosulfonic acid. References which describe these compounds and their preparation include U.S. Pat. No. 2,516,404; the publication of R. G. Pews, Can. J. Chem., vol. 47, 1260 (1969); the publication of Y. Okaya et al., Acta Cryst., vol. 22, 111, (1967); and the publication of R. G. Pews et al., J. Org. Chem., vol. 34, No. 6, 2029 (1969).

Compounds of formula (IX) having a mixed substitution of chloro and bromo substituents can be prepared by reaction of a mixture of hexachlorocyclopentadiene and hexabromocyclopentadiene with chlorosulfonic acid using essentially the same reaction procedures set forth in the above-cited references. Hexahalocyclopentadienes containing a mixture of chloro and bromo substituents may also be so reacted. Different ratios of hexachlorocyclopentadiene, hexabromocyclopentadiene, and hexahalocyclopentadiene may be used to modulate the ratio of chloro to bromo substituents in the reaction product.

The following Examples are provided to further illustrate the present invention. Except where otherwise indicated, the indexes of refraction and Abbe numbers reported in the following Examples were determined using a Bausch and Lomb Abbe refractometer. The polymer samples were placed between glass plates having a higher index of refraction than the polymer and heated to a temperature at which the polymer flowed readily. The glass plate were then carefully pressed together so as to form a uniform film of the polymer therebetween. The resultant sample was then cooled and placed on the refractometer prism utilizing a minimal amount of 1-bromonaphthalene to establish a continuous and substantially air-free juncture between the bottom surface of the lower glass plate and the prism surface. The $n_D$ and $v$ measurements were made in accordance with standard procedures at ambient temperature hereinafter indicated in °C. by superscript on $n_D$. Specific limitations set forth in the following examples are intended as illustrative and not limitative.

It will be appreciated that the halogenated pentacyclodecyl-containing materials described herein are poly-halogenated materials. Accordingly, these materials may exhibit toxicity and the requisite care attending the handling of toxic or potentially toxic materials should be exercised in the conduct of synthetic procedures described in the present specification and particularly the Examples hereof.

EXAMPLE 1

Preparation of the compound

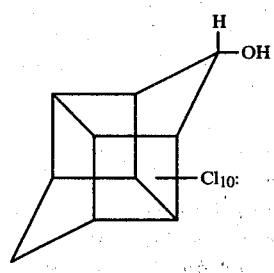

(a) To a 1000 ml., 3-necked round-bottom flask equipped with a magnetic stirrer, thermometer, condenser, and stoppered addition funnel were added 100 ml. of hexachlorocyclopentadiene and 100 ml. of chlorosulfonic acid. The reagents were stirred at 100° C. for 3 hours resulting in formation of a crystalline mass. Methylene chloride (300 ml.) was added to effect dissolution of the crystalline mass, the solution was cooled in an ice bath, and 30 ml. of water were added dropwise while maintaining the temperature at about 10° C. An additional 100 ml. of water were then added and the mixture was transferred to a 1 liter separatory funnel. The methylene chloride phase was separated from the aqueous phase, the aqueous phase was extracted with methylene chloride, and the methylene chloride solutions were combined. The methylene chloride was evaporated on a steam bath using an air jet and the resultant yellow solid residue dried under aspirator vacuum. The yellow solid was then Soxhlet extracted with 600 ml. of hexane, the hexane solution cooled in ice, and the resultant precipitate filtered and dried to yield 156.7 g. of the chlorosulfate ester having the structural formula

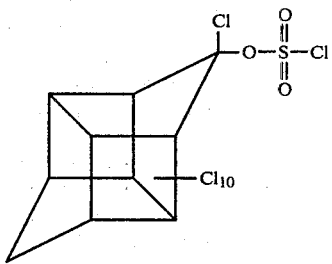

The off-white chlorosulfate ester had a melting point of 151°–153° C.

(b) The chlorosulfate ester (60 g.) prepared as described above was dissolved in 600 ml. of anhydrous diethyl ether in a 2 liter, 3-necked round-bottom flask equipped with a magnetic stirrer, heating mantle, thermometer, condenser with nitrogen bubbler, and addition funnel. The solution was brought to reflux, purged with nitrogen, and 320 ml. of a 25% by weight solution of diisobutyl aluminum hydride in toluene (approximately a 5-fold molar excess of diisobutyl aluminum hydride) were added over 1½ hours to the refluxing solution. After 2 additional hours at reflux, 40 ml. of methanol were added over about 1 hour, resulting in formation of a paste. The mixture was maintained at reflux during the methanol addition. 450 ml. of 10% aqueous hydrochloric acid were then added carefully and the mixture refluxed until two clear phases formed. The mixture of phases was cooled and transferred to a separatory funnel. The phases were separated and the aqueous phase extracted twice with toluene. The toluene extracts were combined with the original organic phase and then evaporated to yield 50.6 g. of a light yellow solid. The solid was Soxhlet extracted with 700 ml. of hexane. The hexane solution was distilled to about 400 ml. and cooled, resulting in crystallization of a white solid. The solid was filtered and dried yielding 39.7 g. of the decachloropentacyclodecyl alcohol having the structure

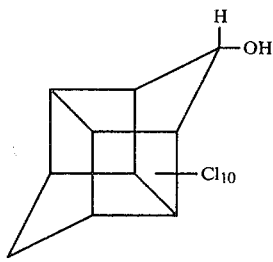

The structure of the alcohol was confirmed by infrared and nuclear magnetic resonance analysis.

EXAMPLE 2

Preparation of the compound

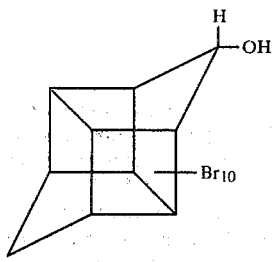

(a) Hexabromocyclopentadiene (10.0 g.) and chlorosulfonic acid (30 ml.) were stirred in a 100 ml. Morton flask in a 50° C. oil bath for 2 hours. The flask was protected with a drying tube. The reaction mixture was cooled in an ice-water bath for ½ hour and the contents were then filtered under argon through sintered glass. The filter cake was washed with two 10 ml. portions of cold carbon tetrachloride and air-dried to yield 8.4 g. of the chlorosulfate ester having the structural formula

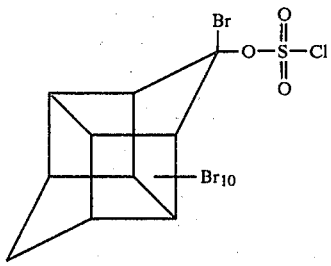

as a light tan solid, m.p. 237° C. (dec.).

(b) The chlorosulfate ester of section (a) of this Example (8.4 g.) was hydrolyzed with 10 ml. of 10% aqueous acetone. Addition of 10% aqueous sodium carbonate resulted in separation of an oil which solidified slowly. The solidified product was broken up, filtered, washed with water, dissolved in boiling isopropanol, and the solution filtered. The filtrate was evaporated and the residue dissolved in toluene. Residual isopropanol was distilled off and the solution was refluxed overnight in a flask equipped with a Dean-Stark trap. After refluxing, the solution was distilled to a 50 ml. volume and 50 ml. of diethyl ether were added after cooling to 15° C. A 25% by weight solution of diisobutyl aluminum hydride in hexane (6.1 ml.; approximately a 15-fold molar excess) was added dropwise over 15 minutes, the solution stirred an additional hour, and quenched with 1 ml. of methanol in 10 ml. of toluene. Water (10 ml.) and 10% aqueous hydrochloric acid (10 ml.) were added and the mixture stirred vigorously. The mixture was filtered through glass wool into a separatory funnel and extracted with dichloromethane. The dichloromethane extract was dried, all the solvents were evaporated, and the residue was chromatographed on a silica gel column using dichloromethane as an eluent. Evaporation of the resultant dichloromethane solution yielded about 5.5 g. of the decabromopentacyclodecyl alcohol

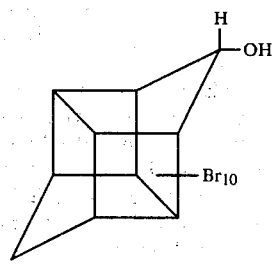

as an off-white solid. The structure of the alcohol was confirmed by infrared and nuclear magnetic resonance analysis.

EXAMPLE 3

Preparation of a homopolymer comprising recurring units of the formula

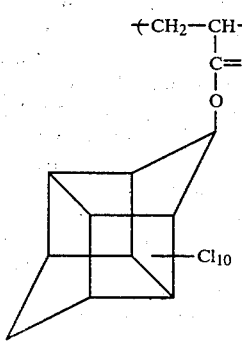

(a) The decachloropentacyclodecyl alcohol prepared as described in Example 1 (8.15 g.) was dissolved in 200 ml. of acetonitrile. To this solution was added, with stirring, 0.8 g. of 50% sodium hydride in oil which had been washed twice with pentane (0.4 g. NaH). After hydrogen evolution ceased, 1.37 ml. of acrylyl chloride in 40 ml. of acetonitrile were added over 15 minutes. The reaction mixture was then stirred overnight under argon, filtered through Celite, and the solvent evaporated. The residue was dissolved in hexane and chromatographed on a silica gel column eluting first with hexane, then with 10% by volume dichloromethane in hexane. A yield of 7.25 g. of the acrylate monomer having the structural formula

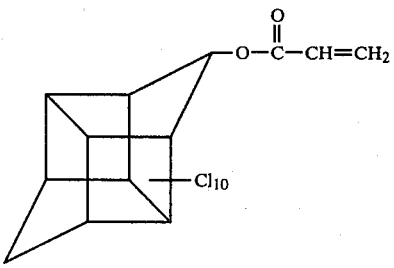

was obtained as a white solid, m.p. 120.5°–121.5° C.

(b) One gram of the acrylate monomer prepared in section (a) of this Example and 3 mg. of azobisisobutyronitrile (AIBN) were dissolved in 5 ml. of benzene in a necked 13×100 mm. test tube and degassed with 3 freeze-thaw cycles. The tube was sealed under vacuum and placed in a 65° C. oil bath for 21 hours. The reaction mixture was then poured into 100 ml. of hexane, precipitating the homopolymer (1) as a white solid. The polymer was filtered and dried, yielding 546 mg. Elemental analysis calculated for $C_{13}H_4Cl_{10}O_2$:

|       | C      | H     | Cl     |
|-------|--------|-------|--------|
| Calc. | 28.56% | 0.74% | 64.85% |
| Found | 28.52% | 0.57% | 64.27% |

As indicated previously, the index of refraction of this polymer was determined microscopically by Becke line analysis. Thus, particles of the polymer were dispersed in oils differing in $n_D$ (Index of Refraction Liquids commercially available from R. P. Cargille Laboratories, Cedar Grove, N.J.) and examined microscopically in accordance with standard procedures of Becke line analysis, as set forth in The Particle Atlas, ed. 2, vol. 1, W. D. McCrone and J. G. Delly, Ann Arbor Science Publ., Ann Arbor, MI, pp. 72–74. Monochromatic source light of 589 nm. was employed. The index of refraction of the polymer particles was thus determined to be 1.573.

EXAMPLE 4

Preparation of copolymer (2):

One gram of the acrylate monomer prepared in Example 3 (a) and 3 mg. of AIBN were dissolved in 5 ml. of benzene in a necked 13×100 ml. test tube. Purified methyl acrylate (165 microliters; 1 eq.) was added and the solution was degassed with 3 freeze-thaw cycles. The tube was sealed under vacuum and placed in a 65° C. oil bath for about 44 hours. The reaction mixture was then poured into 100 ml. of hexane, precipitating the copolymer as a white solid. The solid was filtered and dried, yielding 923 mg. of copolymer (2). The polymer flowed readily at 220°–230° C. to form a clear, colorless film having $n_D^{20}$ of 1.5512 and $v$ of 56.2. Elemental analysis calculated for $C_{17}H_{10}Cl_{10}O_4$:

|       | C      | H     | Cl     |
|-------|--------|-------|--------|
| Calc. | 32.27% | 1.59% | 56.03% |
| Found | 32.01% | 1.57% | 55.17% |

EXAMPLE 5

Preparation of copolymer (3):

Copolymer (3) was prepared by the procedure described in Example 4, except that 196 microliters (1 eq..) of distilled methyl methacrylate were substituted in place of the methyl acrylate. The yield was 913 mg. of white, solid copolymer (3) which flowed readily at 250° C. to form a clear, colorless film.

EXAMPLE 6

Preparation of copolymer (4):

Seven grams of the acrylate monomer prepared as described in Example 3(a) and 2.3 ml. of distilled methyl acrylate were dissolved in 35 ml. of benzene. AIBN (20 mg.) was added and the solution was placed in a heavy glass tube, degassed with 3 freeze-thaw cycles, and sealed under vacuum. The tube was placed in a 60° C. oil bath for 89 hours. The viscous reaction mixture was filtered through cotton into 750 ml. of hexane to precipitate the polymeric product. The copolymer precipitate was isolated by filtration, dissolved in dichloromethane and reprecipitated into 1000 ml. of hexane. The precipitated copolymer was dried under vacuum at 50° C., yielding 8.45 g. of white, solid copolymer (4). The copolymer flowed at 230° C. to give a transparent, almost colorless film having $n_D^{20}$ of 1.5445 and $\nu$ of 56.8.

EXAMPLE 7

One gram of copolymer (4) prepared in Example 6 was placed in a prism mold and heated to 230° C. at 5000 lbs. of pressure. Cooling and removal of the mold yielded a faintly yellow, flat-surfaced prism. The prism was placed on the Abbe refractometer prism utilizing a minimal amount of 1-bromonaphthalene to establish a continuous and substantially air-free juncture between the refractometer prism and sample prism surfaces and $n_D$ and $\nu$ measurements were then immediately made. The prism displayed $n_D^{20}$ of 1.549 and $\nu$ of 57.

EXAMPLE 8

Preparation of copolymer (5):

Copolymer (5) was prepared and isolated by the procedure described in Example 4, except that 1 eq. of ethyl acrylate was substituted for the methyl acrylate and the tube was placed in a 60° C. oil bath for 92 hours. The yield was 979 mg. of copolymer (5), a white solid. The polymer began to flow at 180° C. and formed a clear colorless film having $n_D^{20}$ of 1.5480 and $\nu$ of 56.5.

EXAMPLE 9

Preparation of copolymer (6):

(a) The decabromopentacyclodecyl alcohol prepared in Example 2 (5.54 g.) and 1.07 ml. of triethylamine were dissolved in 50 ml. of dichloromethane. A solution of 0.53 ml. of acrylyl chloride in 10 ml. of dichloromethane was added with stirring and cooling of the reaction mixture over about five minutes. The reaction mixture was stirred overnight at room temperature after which the mixture was cooled in an ice bath and an additional 0.5 ml. of triethylamine was added, followed by addition of a solution of 0.5 ml. of acrylyl chloride in 10 ml. of dichloromethane. The reaction mixture was stirred for four hours as it warmed to room temperature. Water was then added, the resultant two phases separated, and the organic (dichloromethane) phase filtered through glass wool. The dichloromethane solution was then extracted with water, dried, and the solvent evaporated. The residue was chromatographed on a silica gel column using 1:1 by volume dichloromethane:petroleum ether as an eluent. A yield of 4.74 g. of the acrylate monomer

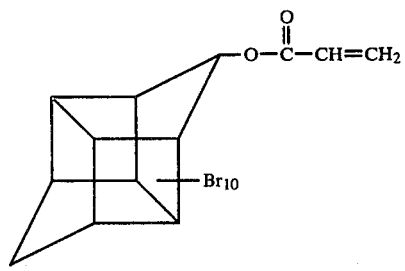

was obtained as a white solid. Upon attempting a melting point determination, the solid began to turn brown at 240° C. but did not melt up to 300° C.

(b) One gram of the acrylate monomer prepared in 9(a) was dissolved in 20 ml. of warm benzene and 202 mg. of distilled ethyl acrylate and 3 mg. of AIBN were added. The solution was degassed in a polymer tube with three freeze-thaw cycles and the tube sealed under vacuum and placed in a 60° C. oil bath for 64 hours. The solution was then filtered through a cotton wad into 300 ml. of hexane resulting in precipitation of copolymer (6) as a white solid. The precipitate was filtered and air-dried to yield 808 mg. of the copolymer.

EXAMPLE 10

Preparation of polymer (8):

(a) Three grams of the decachloropentacyclodecyl alcohol of Example 1, 8.5 g. of powdered anhydrous potassium carbonate, and 60 ml. of acetonitrile were added to a 100 ml. round bottom flask under nitrogen. 3-Bromo-1-propene (1.6 ml.) was then added and the mixture stirred at room temperature for 22 hours. About 10 ml. of water were then added, forming two phases which were separated. The aqueous phase was washed twice with diethyl ether, the ether extracts were combined with the organic phase, and the combined solutions evaporated. Carbon tetrachloride and a small amount of water were added to the residue, the mixture shaken, the phases separated, and the organic phase dried and evaporated to yield a yellow oil. This was dissolved in 2 ml. of petroleum ether and the solution cooled in dry ice to form a crystalline mass. The petroleum ether was removed under vacuum as the mass warmed to room temperature to give 3.17 g. of the allyl ether

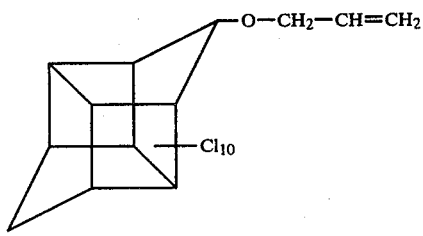

as an off-white solid, m.p. 42.5°–44° C.

(b) In a 50 ml. 3-necked round bottom flask equipped with magnetic stirrer, thermometer, argon bubbler, and septum inlet were added 160 mg. of sodium borohydride, 6 ml. of anhydrous tetrahydrofuran, and 1.2 ml. of 2-methyl-2-butene. The resultant mixture was cooled to 0° C. and 0.7 ml. of boron trifluoride diethyl ether were added dropwise. After stirring for 2 hours at 0° C., 2.0 g. of the allyl ether of 10(a) in 5 ml. of tetrahydrofuran were added slowly. After stirring for one hour at 10° C., 0.5 ml. of water was added followed by simultaneous addition of 2.2 ml. of 10% aqueous sodium hydroxide and 1.7 ml. of 30% aqueous hydrogen peroxide over 10 minutes. The temperature of the reaction mixture was kept below 25° C. during the addition. The mixture was then heated at 50° C. for one hour, poured into 50 ml. of water, and the aqueous mixture extracted with three 50 ml. portions of dichloromethane. The dichloromethane extracts were combined, dried, and evaporated. The residue was chromatographed on a silica gel column with dichloromethane. Evaporation of solvent from the product-containing fractions yielded about 1.4 g. of the hydroxypropyl ether

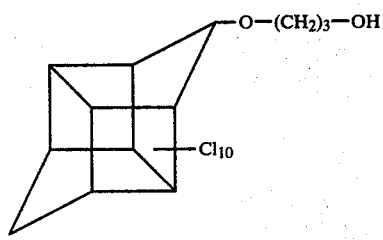

as an off-white solid, m.p. 93°–94° C.

(c) The hydroxypropyl ether prepared in 10(b) (1.4 g.) was dissolved in 15 ml. of dichloromethane and 0.3 ml. of acrylyl chloride was added with stirring. A mixture of 0.53 ml. of triethylamine and 5 ml. of dichloromethane was added slowly with cooling. The reaction mixture was stirred at room temperature for one hour and then extracted successively with 20 ml. of water, 20 ml. of 5% aqueous hydrochloric acid, and 20 ml. of half-saturated sodium bicarbonate. The organic solution was then evaporated to an oil which was chromatographed on silica gel using dichloromethane. Evaporation of solvent yielded a clear oil which was dissolved in pentane and filtered. The solution was partially evaporated and then cooled in dry-ice to separate an oil which failed to crystallize. The remaining pentane was evaporated to yield 1.55 g. of a colorless oil comprising the acrylate monomer of the formula

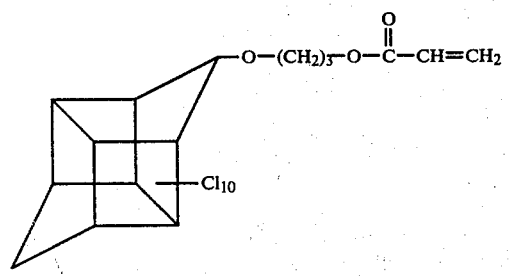

(d) All of the above acrylate monomer oil was polymerized over 63 hours at 60° C. and isolated by the procedure of Example 3. A yield of about 1.3 g. of polymer (8) was obtained as a white solid. The polymer flowed at 230°–240° C. to give a clear film having $n_D^{25}$ of 1.566 and $\nu$ of 54.9.

EXAMPLE 11

Preparation of polymer 9:

(a) The decachloropentacyclodecyl alcohol of Example 1 (39.7 g.), 112 g. of powdered anhydrous potassium carbonate, and 800 ml. of acetonitrile were combined in a 2 l. round bottom flask equipped with heating mantle, stirrer, thermometer, and condenser under a nitrogen bubbler. 1,4-Dibromobutane (200 ml.) was added and the mixture stirred at reflux for about 20 hours. The mixture was cooled, 200 ml. of ice-water added, and the resultant phases separated. The organic phase was evaporated on a rotary evaporator leaving an oily residue. The aqueous phase was extracted twice with toluene and the toluene extracts were combined with the oily residue, dried, and the toluene evaporated on a rotary evaporator. Excess 1,4-dibromobutane was removed under high vacuum at 65° C. on a rotary evaporator. The residue was dissolved in 400 ml. of hexane, charcoal was added, the mixture filtered through a Soxhlet thimble, and the thimble extracted with the hexane. The extract was boiled down to about 200 ml., cooled in ice, and the resultant crystallized solid filtered and dried to give 41.4 g. of the bromobutyl ether

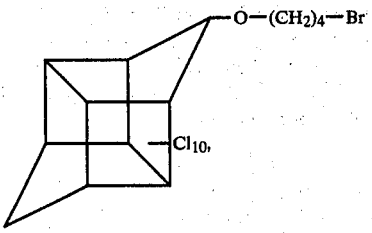

having a melting point of 96°–99° C.

(b) Acrylic acid (2.2 ml.) was dissolved in 100 ml. of methanol and the solution was cooled in an ice-bath with stirring. To the cold acrylic acid solution were added 32 ml. of a 1 molar solution of tetrabutylammonium hydroxide in methanol. Additional acrylic acid was then added dropwise until the pH of the solution was acidic (about pH 6). The solution was evaporated on a rotary evaporator with the surrounding bath at 25°–30° C., and 100 ml. of acetonitrile were added and then evaporated to azeotropically remove methanol and water. The residue was dissolved in 250 ml. of acetonitrile and 18 g. of the bromobutyl ether prepared in 11(a) were added. The reaction mixture was stirred at room temperature under nitrogen for about 20 hours after which the acetonitrile was evaporated, 100 ml. of water were added, and the mixtures swirled vigorously. An oil settled to the bottom and solidified. The solidified material was comminuted, isolated by filtration, and air dried. It was then Soxhlet extracted with n-pentane, the n-pentane evaporated, and the solid residue dissolved in a minimal amount of dichloromethane and chromatographed on a silica gel column. Evaporation of the dichloromethane from combined product-containing fractions yielded 16.4 g. of the acrylate monomer of the formula

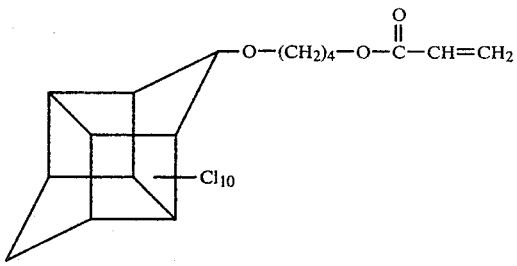

as an off-white solid, m.p. 89°–91° C. This product was recrystallized from hexane, utilizing charcoal for decolorization, yielding 14.4 g. of white crystals, m.p. 90.5°–91.5° C.

(c) A portion of the acrylate monomer of 11(b) (819 mg.) and 2.5 mg. of AIBN were dissolved in 4 ml. of benzene. The solution was degassed, sealed under vacuum, and heated at 60° C. for about 64 hours. The reaction mixture was then poured into 100 ml. of hexane precipitating the polymer as a gummy mass. This was redissolved in dichloromethane, the solution evaporatd to a volume of about 5 ml., and reprecipitated into about 100 ml. of hexane. The resultant mixture was stirred at a boil to remove the dichloromethane and then cooled to solidify the precipitated polymer. The polymer was isolated by filtration and dried under vacuum at 56° C. to a constant weight. Yield of 574 mg. of polymer (9). The polymer flowed at 190° C. and gave a clear film having $n_D^{25}$ of 1.5678 and $\nu$ of 54.8.

EXAMPLE 12

Preparation of polymer (12):

(a) Thirty grams of the decachloropentacyclodecyl alcohol of Example 1, 166 ml. of 1,5-dibromopentane, and 84 g. of powdered potassium carbonate were placed in 600 ml. of acetonitrile and the mixture stirred under nitrogen, at reflux, for about 20 hours. The reaction mixture was cooled, 150 ml. of water were added, and the mixture stirred vigorously. The phases were separated, the aqueous phase extracted twice with dichloromethane, and the extracts combined with the original organic phase. This combined solution was extracted with dilute aqueous hydrochloric acid, dried, and then heated to distill off the dichloromethane. Excess 1,5-dibromopentane was then distilled off under high vacuum using a 100° C. oil bath. The product residue was recrystallized from dichloromethane/methanol, with cooling in dry ice, to yield 31.5 g. of the bromopentyl ether

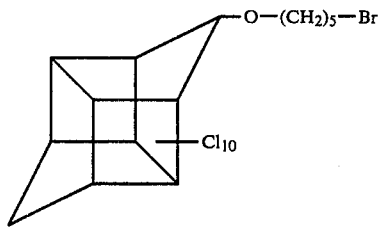

as an off-white solid. This was recrystallized from n-pentane after charcoal treatment to yield the product as a white solid, m.p. 60°–61° C.

(b) Acrylic acid (0.6 ml.) and tetrabutylammonium hydroxide (about 7.8 ml. of a 1 M. methanol solution) were reacted as described in Example 11(b) to prepare tetrabutylamonium acrylate. This was dissolved in 75 ml. of acetonitrile.

Five grams of the bromopentyl ether of 12(a) were added to the acetonitrile solution of tetrabutylammonium acrylate and the resultant solution stirred at room temperature for about 20 hours. The acetonitrile was then evaporated on a rotary evaporator and 100 ml. of water were added, resulting in formation of an oil. The oil-water mixture was extracted with cyclohexane and the organic phase was dried and evaporated to yield a light yellow oil. This was chromatographed on a silica gel column with dichloromethane. Evaporation of product-containing fractions yielded an oil which crystallized when dissolved in pentane and cooled. The cold pentane was evaporated by a nitrogen stream and the resultant solid dried under vacuum. It was then dissolved in 50 ml. of warm methanol, filtered, and cooled in dry-ice to recrystallize the product. The methanol was decanted and the residual product dried under vacuum yielding about 3.6 g. of the acrylate monomer

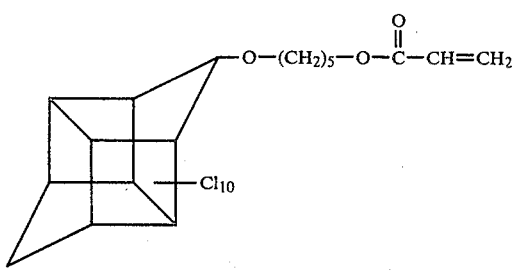

as white crystals, m.p. 75°–75.5° C.

(c) Two grams of the monomer prepared in 12(b) and 0.5 mg. of azobis-α,γ-dimethylvaleronitrile (available from E.I. duPont de Nemours and Co., Inc., Wilmington, Del. under the tradename VAZO-52) were dissolved in 5 ml. of benzene, the solution deoxygenated with argon, frozen, evacuated, sealed, and placed in a 45° C. oil bath for 93 hours. The reaction mixture was then cooled and diluted with 20 ml. of dichloromethane and poured into about 200 ml. of methanol to precipitate polymer (12). The precipitated polymer was isolated by filtration and dried under vacuum. A yield was obtained of 1.8 g. of polymer (12) as a white powder. The polymer flowed well at 150° C. to give a clear film having $n_D^{22}$ of 1.5663 and $\nu$ of 54.9.

As mentioned previously, the polymers of this invention are adaptable for use as raw materials in molding processes. Thus, for example, a polymer of this invention can be heated to an appropriate temperature above its softening point and thereafter introduced into a mold in accordance with known procedures. It should be understood, however, that the monomers of formula (V) or partially polymerized monomers of formula (V) can be "cast" into molded articles, i.e., the homopolymerization or copolymerization of the monomer or further homopolymerization or copolymerization of the "partial polymer" can be conducted in a mold to provide a desired lens, prism or other molded article. The polymers of this invention can also be employed for the production of optical films or coatings. Thus, a suitable solvent such as methylene chloride or chloroform can be employed for the coating of polymeric films or coatings exhibiting the desired optical properties of the polymers of this invention.

What is claimed is:

1. A normally solid polymer comprising recurring units of the formula

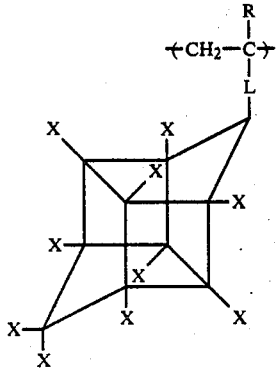

wherein R is hydrogen or lower alkyl containing from 1 to 5 carbon atoms, L is a divalent linking group, and each X is independently chloro or bromo.

2. A polymer of claim 1 wherein R is hydrogen or methyl.

3. A polymer of claim 1 wherein each X is chloro.

4. A polymer of claim 1 wherein each X is bromo.

5. A polymer of claim 1 wherein said recurring units are of the formula

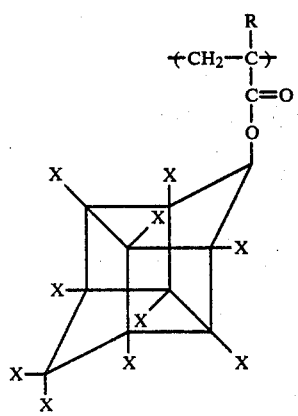

6. A polymer of claim 5 which is a copolymer comprising recurring comonomeric units derived from ethylenically unsaturated comonomers.

7. A polymer of claim 6 wherein said comonomeric units are derived from an acrylate or methacrylate comonomer.

8. A polymer of claim 7 wherein R is hydrogen or methyl and each X is chloro.

9. A polymer of claim 7 wherein R is hydrogen or methyl and each X is bromo.

10. A polymer of claim 1 wherein said recurring units are of the formula

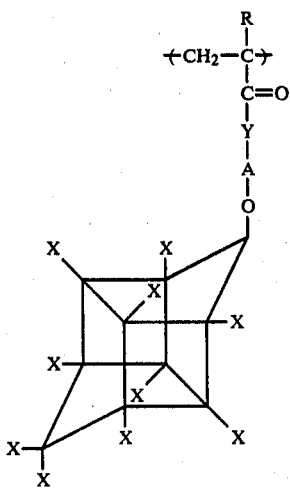

wherein A is an alkylene group containing from 1 to about 12 carbon atoms or wherein A is an alkylene ether or alkylene diether group of the formula

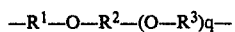

$$-R^1-O-R^2-(O-R^3)_q-$$

wherein $R^1$, $R^2$, and $R^3$ are the same or different alkylene groups, each containing from 1 to 6 carbon atoms, q is zero or 1, and —Y— is —O— or —NH.

11. A polymer of claim 10 wherein said recurring units are of the formula

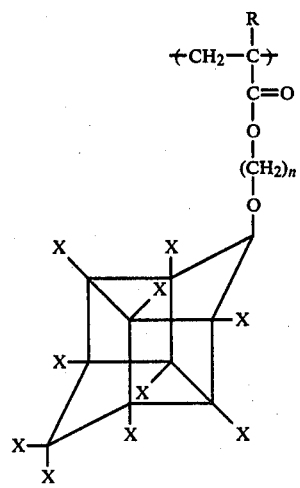

wherein n is 2 to 12.

12. A polymer of claim 11 wherein R is hydrogen or methyl and each X is chloro.

13. A polymer of claim 12 wherein n is 4.

14. A polymer of claim 12 wherein n is 5.

* * * * *